Patented May 4, 1954

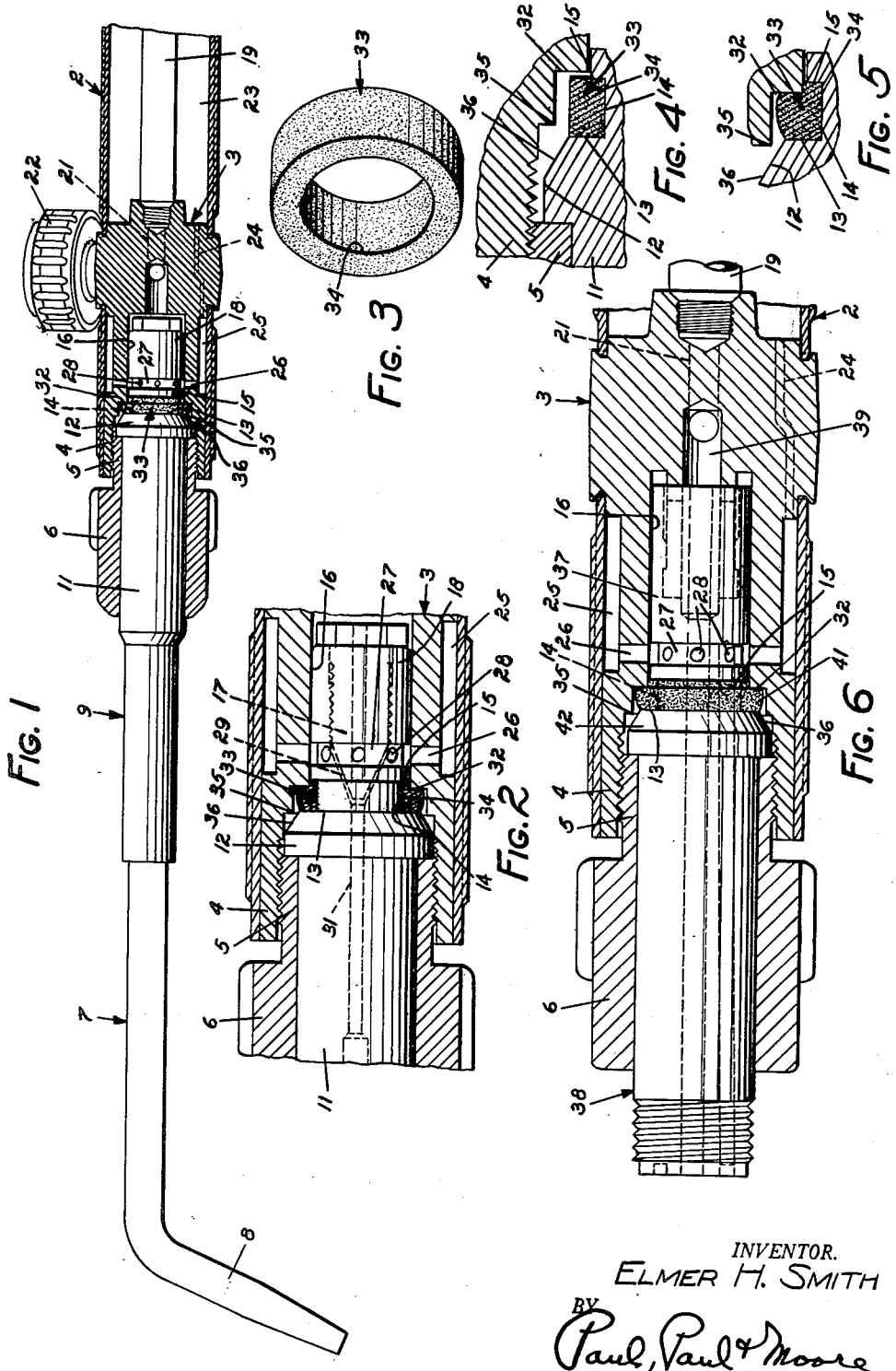

2,677,416

UNITED STATES PATENT OFFICE 2,677,416

OXYGEN AND ACETYLENE TORCH

Elmer H. Smith, Minneapolis, Minn., assignor to Smith Welding Equipment Corporation, Minneapolis, Minn., a corporation of Minnesota Application September 25, 1948, Serial No. 51,244

5 Claims. (Cl. 158—27.4)

This invention relates to new and useful improvments in cutting and welding torches.

In the operation of a cutting or welding torch, it sometimes becomes necessary to direct the flame first in one direction and then in another direction, in order that all of the work may be adequately heated. To accomplish this, with a conventional torch, the operator usually bodily turns the entire torch to direct its flame against the work. To thus operate a torch while supported in an inverted position may make the job rather awkward to perform, because the usual gas control valves of the torch may then be inconveniently located for the operator.

It is possible with various known torches, such as the one shown in my Patent No. 2,231,199, granted February 11, 1941, to rotatably adjust the tip with respect to the torch handle, but this requires interruption of the work as the operator must loosen the usual nut which secures the tip in position in the handle, in order to free the tip so that it may be relatively adjusted in the handle. Where time is at a premium, such interruptions of the torch may be costly. It would therefore be highly desirable that means be provided in such torches whereby the torch tip might readily be rotatably adjusted in the torch handle at any time without interrupting the cutting or welding operation.

An important object of the present invention, therefore, is to provide means in a cutting or welding torch whereby the usual tip of the torch may readily be rotatably adjusted in the torch handle without requiring the manipulation of securing nuts or other elements, and whereby such adjustment of the tip may be performed at any time without interrupting the operation of the torch.

A further and more specific object is to provide a torch comprising a handle having a head at one end adapted to removably receive the usual tip of the torch, and having means at its opposite end for supplying acetylene and oxygen thereto, and a resilient sealing element being interposed in the connection between the torch tip and its head for sealing the joint therebetween, and whereby the tip may readily be rotated with respect to the torch handle without breaking the seal between the tip and the handle and without requiring the manipulation of securing elements.

A further object is to provide a torch comprising a handle having a head secured in one end thereof and having a cylindrical bore terminating at its open end in an annular seat adapted to be engaged by a resilient sealing element carried on the tip supporting member of the torch, and against which the sealing element may be compressed by manipulation of the usual tip securing nut; and an annular auxiliary seat being axially spaced from said first seat adapted to engage a cone-shaped surface provided on the inner end of the tip base, whereby should the resilient sealing element fail to seal the joint between the tip supporting member and the torch head, the inner end portion of the tip supporting member may be axially translated in the torch head to move its cone-shaped face into sealing engagement with said auxiliary seat, whereby failure of the resilient sealing element will not cause interruption of the torch.

Other objects of the invention reside in the simple and inexpensive construction of the sealing element and the manner of inserting it in the torch head to seal the connection between the torch head and the inner end of the tip; in the combination of the two axially spaced seats, the auxiliary seat being of relatively larger diameter than the seat with which the resilient element is engaged, whereby the sealing element may function to seal the joint between the tip and torch head independently of the auxiliary seat, by simply rotating the tip-securing nut with the fingers, and whereby the tip of the torch may be freely rotatably adjusted in the handle without interrupting the operation of the torch.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a view partially in section showing a portion of a torch handle having a tip detachably secured in the head thereof and the resilient sealing element being shown in its normal compressed condition to seal the joint between the inner end of the tip base and the torch head;

Figure 2 is an enlarged detail sectional view showing only a portion of the torch head to illustrate the arrangement of the dual seats provided therein;

Figure 3 is a perspective view of the resilient sealing element removed from the torch;

Figure 4 is a fragmentary view showing the sealing element in cross section and prior to being compressed;

Figure 5 is a view similar to Figure 4, but showing the resilient sealing element compressed; and Figure 6 is a view showing the invention applied to a cutting torch.

To facilitate the explanation of the present invention there is illustrated in Figure 1 a portion of a conventional welding torch comprising the usual handle 2, having a head 3 secured to one end thereof and provided with a threaded socket 4 adapted to receive a threaded extension 5 provided on one end of a nut 6 which serves to detachably secure the tip in position in the torch head 2.

In Figure 1 the tip, generally designated by the numeral 7, is shown in its composite form, and comprises the usual tube-like end portion 8, secured in a tip supporting member, generally designated by the numeral 9.

The tip supporting member 9 has an enlarged cylindrical portion 11 fitting in a bore in the nut 6, and is provided at its inner end with a frusto-conical head 12 having a flat end face 13 forming one side of an annular groove 14. The opposite wall of said groove is shown defined by one side of an annular flange 15 fitting in a reduced bore 16, spaced inwardly from the threaded socket 4 in which the nut 6 is received in threaded engagement. A nozzle 17, indicated in dotted lines in Figure 2, is shown received in threaded engagement with a threaded bore provided in the inner cylindrical end portion 18 of the member 9. Oxygen is supplied the nozzle 17 from a conduit 19, through a metered passage 21, the size of which may be varied by manipulation of a suitable valve, indicated at 22 in Figure 1.

Acetylene gas may be delivered into the interior 23 of the handle 2 by suitable means, not shown, and passes through a metered passage 24 into an annular chamber 25, and thence through radial ducts 26 into an annular groove 27 having apertures 28 in its bottom for conducting the acetylene into an annular gap 29 provided around the tip of the nozzle 17, as indicated in dotted lines in Figure 2. Acetylene and oxygen are delivered into the passage 31 at the tip of the nozzle 17, whereby they become thoroughly intermixed to provide a combustible fuel gas as is well known in the art. The above described structure is illustrated in detail in my copending application hereinbefore mentioned.

An important feature of the present invention resides in the provision of means whereby the composite tip 7 may be relatively rotatably adjusted in the head 3 without requiring the manipulation or loosening of securing elements or nuts 6, as is common in conventional torches. It is often necessary that the flame of a torch be directed in an upward or sideways direction, as compared to the usual downward direction of the flame under normal operating conditions. Heretofore this has required that the operator rotate the handle of the torch by rotating his wrist which may become exceedingly tiresome, if the torch is to be held in that position for a considerable period of time.

It is, of course, possible in a conventional torch to rotatably adjust the tip in the handle, but this usually requires that the gas be shut off to enable the operator to loosen the usual securing nut of the tip and adjust the tip to the proper angle and secure it in such position, after which the torch must again be lighted. The invention herein disclosed makes it possible to relatively rotate the tip in the head at any time by simply grasping the tip with the figures and turning it to the desired angle. This makes it possible to adjust the tip in the handle at any time while the torch is in operating position and without interrupting the operation thereof.

To thus rotatably support the tip 7 in the head 3, an annular shoulder or seat 32 is provided between the reduced bore 16 and the threaded socket 4, as best shown in Figure 2, against which one side of an annular resilient sealing element 33 is seated. The opposite side of the resilient element 33 is seated against the radial wall 13 constituting one side of the groove 14 provided between the frusto-conical head 12 of the tip supporting member 11 and the reduced end portion 18.

The bore 34 of the resilient sealing element 33 snugly fits the bottom of the groove 14, and its axial length is such that when positioned in the groove 14 between the face 13 and seat 32, it may be sufficiently compressed therein by rotation of the nut 6 with the fingers only to thereby positively prevent any leakage of the fuel gases around said sealing element and between the threads of the nut 6 and head 3 to the atmosphere, as will be understood. The composition of the sealing element 33 is also such that the inner portion of the member 9 constituting the cylindrical portion 11 and 18 may readily be rotated with respect to the head 3 of the torch handle without loosening the nut 6, and without any danger of causing leakage around the sealing element 33.

A further object of the invention resides in the provision of an auxiliary seat 35 which may be engaged by the face 36 of the frusto-conical head 12 of the tip supporting member 9 by manipulation of the nut 6, should the resilient sealing element 33 fail to seal the joint between the bore 16 and threaded socket 4.

The annular seats 32 and 35 thus provide means whereby leakage of the gases from the tip end of the handle 2 is positively eliminated. Under normal operating conditions the resilient sealing element 33 only is utilized, and provides a positive seal which is such that the tip may be relatively rotated in the head 3 by simply loosening the nut 6 with the fingers, whenever desired, while the torch is in operation. Should the sealing element for some reason fail to serve its purpose, the operation of the torch need not be interrupted because of leakage from the end of the torch, because in such an emergency the nut 6 may be manipulated to move the conical face 36 of the head 12 into engagement with the annular seat 35, as hereinbefore stated.

The embodiment of the novel sealing element 33, herein disclosed, does not in any way complicate the construction or operation of the torch. The annular shoulders or seats 32 and 35 may readily be constructed by a turning operation when making the bore 16 in the torch head 3. In like manner, the provision of the annular groove 14 with its opposed side walls 13 and 15, and including the head 12, does not complicate the construction of the inner portions 11 and 13 of the tip supporting member 9, as will readily be understood by reference to the drawing, particularly Figure 2.

In Figure 6 the invention is shown embodied in a cutting tip in which the inner cylindrical end portion 37 of the tip supporting member 38 is shown slightly longer than the corresponding part 18 of the previous figures. Means is provided at the inner end of the part 37 for connecting it to the usual oxygen passage 39 provided in the torch head. A sealing element 41, similar to the sealing element 33 illustrated in Figure 2, is shown mounted on the tip supporting member 38 adjacent to the frusto-conical head 42 and is normally engaged with the seat 32 provided in the head 3, as shown on the drawing. The tip supporting member 38 of the torch tip may be secured in the head by manipulation of the usual securing nut 6 by the fingers only, whereby the tip is frictionally retained in the head in leakproof relation thereto.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. A torch comprising a handle portion having means at one end for connecting it to a supply of fuel gas, a head secured in the opposite end of the handle and having a cylindrical bore therein, means for establishing communication between said bore and the supply of fuel gas, an annular seat at the open end of the bore, a torch tip supporting member having a cylindrical terminal portion fitting in said bore, an annular shoulder on said member, a resilient sealing element interposed between said seat and shoulder, means for detachably securing the tip supporting member in the torch head and whereby said resilient sealing element is compressed between said shoulder and seat to thereby prevent leakage of the fuel gas from the torch head under normal operation of the torch, and an emergency sealing means normally inoperative, but capable of sealing the connection between the tip supporting member and the torch head by increased manipulation of the tip securing means, should said resilient sealing element fail.

2. A torch comprising a handle portion having means at one end for connecting it to supplies of oxygen and acetylene, a head secured to the opposite end of the handle and having a cylindrical bore therein, means for establishing communication between the supplies of oxygen and acetylene and said bore, an annular seat at the open end of the bore, a torch tip having a cylindrical portion fitting into said bore and having an annular shoulder spaced from said seat and disposed in opposed relation thereto, an annular resilient sealing element carried by the inner end of the tip and positioned between said seat and shoulder, a member for detachably securing the tip in the torch head and whereby the resilient sealing element may be compressed between said seat and shoulder to prevent leakage of the fuel gas from the end of the torch head, and also whereby the tip may be rotatably adjusted in the head while the torch is in operation, and auxiliary sealing elements normally inoperative, but capable of being actuated to seal the connection between the torch head and tip by increased manipulation of the tip securing member, in the event the resilient sealing element fails.

3. A torch comprising a handle portion having means at one end for connecting it to a supply of fuel gas, a head secured in the opposite end of the handle and having an enlarged threaded socket therein terminating at its bottom in an annular seat, a relatively smaller bore extending into the head from said seat, means for establishing communication between the supply of fuel gas and said bore, a torch tip supporting member having a cylindrical terminal portion fitting in said bore, said tip supporting member having a fuel gas passage therein in communication with said bore, an annular shoulder on said member, a readily compressible sealing element carried by the tip supporting member adjacent to said shoulder, a nut received in threaded engagement with said socket for detachably securing the tip supporting member in the torch head, and whereby the sealing element may be compressed between said shoulder and seat to prevent leakage of the fuel gas from the torch head under normal operation of the torch, and auxiliary sealing means normally inoperative, but capable of being actuated to seal the connection between the tip supporting member and the torch head by increased manipulation of the tip securing nut, should said resilient sealing element fail.

4. A torch comprising a handle portion having means at one end for connecting it to supplies of oxygen and acetylene, a head secured in the opposite end of the handle and having an enlarged threaded socket provided at its bottom with an annular seat, a relatively smaller bore extending into the head from said seat, means for establishing communication between the supplies of oxygen and acetylene and said bore, a torch tip supporting member having a portion fitting in said bore, said tip supporting member having a fuel gas passage therein in communication with the bore, an annular shoulder on said member, a resilient sealing element carried on the tip supporting member and positioned adjacent to said shoulder, a nut received in threaded engagement with the walls of said socket to detachably secure the tip supporting member in the torch head, and whereby the resilient sealing element may be compressed between said shoulder and seat to prevent leakage of the fuel gas from the torch head by finger manipulation only of the tip securing nut, and also whereby the tip supporting member may be rotatably adjusted in the torch head without interrupting the operation of the torch, and auxiliary complemental sealing means in the bottom of said socket and on the tip supporting member made operable to seal the connection between the torch head and tip supporting member by increased rotation of the tip securing nut, should the resilient sealing element fail.

5. A torch comprising a hollow handle having means at one end for connecting it to supplies of oxygen and acetylene, a head secured in the opposite end of the handle and having a large threaded terminal socket terminating at its inner end in a reduced cylindrical bore, axially spaced annular seats between said threaded socket and said bore, one of said seats being relatively larger than the other, a torch tip supporting member having a terminal portion fitting in said bore, and provided with a frusto-conical head intermediate its ends, said tip supporting member having a fuel gas passage therein, means for controlling the flow of fuel gas from said bore to the passage in the tip supporting member, said frusto-conical head having a radial wall axially spaced from the smaller of said annular seats, a resilient sealing element mounted on the tip supporting member and disposed between said radial wall and the smaller of said seats, a nut bored to receive the tip supporting member and having a portion received in threaded engagement with said socket and whereby manipulation of said nut by the operator's fingers may compress said sealing element sufficiently to prevent leakage of the fuel gas from the torch head, and said frusto-conical head having a conical face adapted to be moved into engagement with the relatively larger of said annular seats by additional rotation of the securing nut, thereby to provide an emergency seal for sealing the connection between the tip and torch head, should the resilient sealing element fail.

References Cited in the file of this patent
UNITED STATES PATENTS

| Number | Name | Date |
|---|---|---|
| 981,342 | Williams | Jan. 10, 1911 |
| 1,282,416 | Harris | Oct. 22, 1918 |
| 1,436,392 | Ganz | Nov. 21, 1922 |
| 1,554,407 | Coberly | Mar. 17, 1924 |
| 2,176,813 | Hammon | Oct. 17, 1939 |
| 2,203,210 | Young | June 4, 1940 |
| 2,231,199 | Smith | Feb. 11, 1941 |
| 2,378,329 | Rotter | June 12, 1945 |
| 2,453,597 | Sarver | Nov. 9, 1948 |
| 2,468,315 | Wagner | Apr. 26, 1949 |